United States Patent

[11] 3,546,394

[72] Inventors Eric G. Platt
Westmont;
Marvin F. Thompson, Palos Heights, Ill.

[21] Appl. No. 688,110
[22] Filed Dec. 5, 1967
[45] Patented Dec. 8, 1970
[73] Assignee International Telephone and Telegraph Corporation

[54] ELECTRONIC SWITCHING TELEPHONE SYSTEM USING MOS DEVICES
7 Claims, 12 Drawing Figs.

[52] U.S. Cl. ........................................................ 179/18, 340/166
[51] Int. Cl. ........................................................ H04g 3/42
[50] Field of Search ............................................ 179/18.7 (YA); 340/166

[56] References Cited
UNITED STATES PATENTS

| | | | |
|---|---|---|---|
| 3,047,667 | 7/1962 | Hussey | 179/18(.7YA)UX |
| 3,302,076 | 1/1967 | Kang et al. | 317/234 |
| 3,343,129 | 9/1967 | Schmitz | 340/166 |
| 3,392,373 | 7/1968 | Rouzier | 340/166 |
| RE26,498 | 12/1968 | Macrander | 179/18(.7YA)UX |

*Primary Examiner*—Kathleen H. Claffy
*Assistant Examiner*—William A. Helevestine
*Attorneys*—C. Cornell Remsen, Jr., Rayson P. Morris, Percy P. Lantzy, J. Warren Whitesel, Phillip A. Weiss and Delbert P. Warner

ABSTRACT: A switching network includes a cascade of matrices, each matrix comprising an MOS-PNPN diode connected across each intersection of a vertical and a horizontal multiple. The potentials of vertical busses in the matrices change as a function of busy and idle conditions. These potentials are fed back from the vertical busses to the MOS layers of the diodes connected to those busses to enable or inhibit those diodes as a function of the cross-point availability. Various circuits are provided for gating the feedback signal to allow a selection of possible paths while enabling a random cross-point selection.

INVENTORS
E.G. PLATT-M.F. THOMPSON
BY
ATTORNEY

ELECTRONIC SWITCHING TELEPHONE SYSTEM USING MOS DEVICES

This invention relates to telephone systems and more particularly to electronic switching systems using MOS cross-points.

The invention makes use of end-marked, current-controlled telephone-switching networks. Briefly, in telephone systems using this type of network requests for switch paths are made when control equipment of any suitable type, applies a firing potention to the two ends of a desired path. Responsive thereto, network cross-points fire in a random manner until a self-seeking path finds its own unguided way between the two end-marked points. Thereafter, the cross-points latch and the path holds itself until current is removed from the end points. Then the path drops itself.

In the past, these networks have very often used PNPN diodes, gas tubes, glass reeds controlled by electronic switches or the like. Now, there are newer and more sophisticated devices which open new vistas of switching possibilities. One of these devices is a diode having PNPN layers covered by a metal-oxide-silicon (MOS) layer. If a potential is applied to the metal-oxide the effective junction area is changed, thereby modifying the switching characteristics of the device.

Thus, an object of the invention is to provide a switching system for exploiting MOS devices and the added sophistication provided thereby. Another object is to provide switching systems having both low cost and great versatility.

According to one aspect of the invention, a matrix of horizontal and vertical conductors is provided with MOS–PNPN diodes at each cross-point. The MOS layers are connected to control circuitry in a manner which alters the firing characteristics of the diodes as a function of their availability. Thus, the potential on the MOS layers of selected ones of the diodes enable them to fire when they are at the cross-points which may be included in a desired switch path. The potential on the MOS layers of other diodes, which may not be so included, inhibit them and thereby prevent them from firing.

The above mentioned and other features and objects of this invention and the manner of obtaining them will become more apparent, and the invention itself will be best understood by reference to the following description of an embodiment of the invention taken in conjunction with the accompanying drawings, in which.

Figure 1:
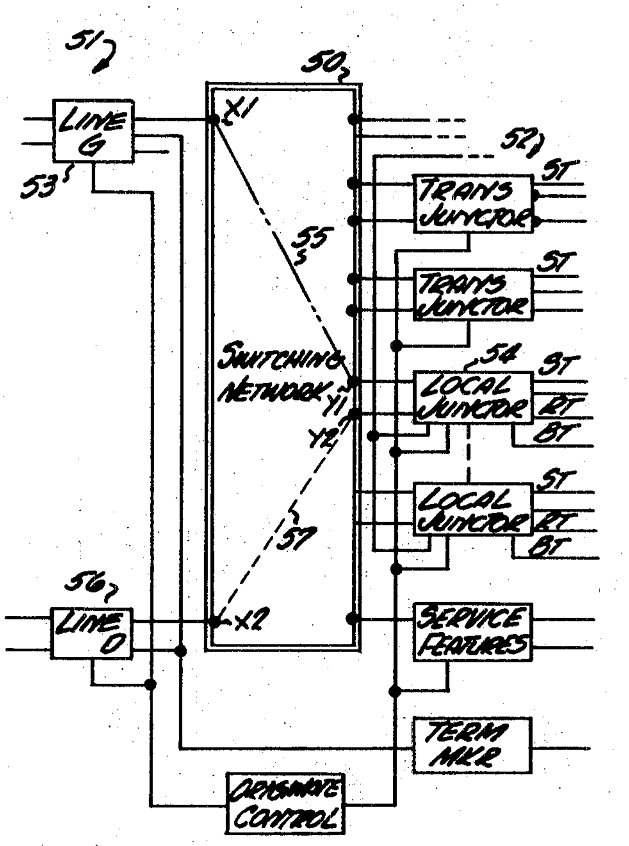
FIG. 1 PRIOR ART
FIG. 1 is a block diagram showing an exemplary switching system using the invention.

Means are provided for completing and holding switching paths responsive to end markings applied to a network. More particularly, FIG. 1 shows a switching system utilizing an end-marked network 50. Lines 51 are connected to one side of the network 50, and control equipments 52 are connected to the other side of the network. In general, the line circuits place a demand for service by applying an end-marking potential at an individually associated point X on the line side of the network. Equipments assigned to serve a call place another end marking at an individually associated point Y on the control side of the network. Then a self-seeking path finds its own way from one end-marking over randomly selected cross-points in the network 50 to the other end-marking, as over the dot-dashed line 55, for example. Thus, a calling line 53 may mark point X1 and seize an assigned control circuit 54 which marks point Y1. After the calling subscriber dials a wanted number, the called line 56 end-marks the point X2, and the control circuit 54 end-marks the point Y2. Then, another self-seeking path 57 finds its way from point X2 through the network 50 to point Y2. The control circuit 54 now interconnects the points Y1, Y2 to complete a talking path from the calling line 53 to the called line 56.

The construction and operation of the system described thus far is common to most end-marked networks of the described type. In fact, the system itself is shown and described in U.S. Pat. No. 3,324,248 entitled "Electronic Switching Telephone System" granted June 6, 1967 to D. L. Seemann et al., and assigned to the assignee of this invention. Reference may be had to this and other related patents for additional background information. The present invention is primarily concerned with the various control circuits which may be used to retrofit and equip a system (such as the Seemann et al. System) with MOS–PNPN diodes.

Figure 2:
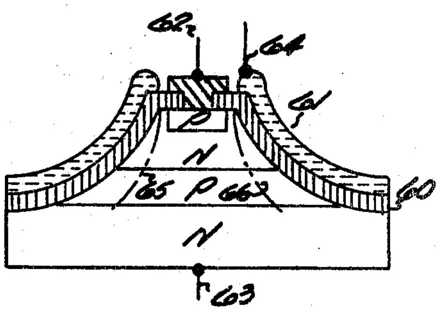
FIG. 2 is a cross section view of a typical MESA type MOS–PNPN diode.

FIG. 2 shows an MOS–PNPN diode of the type used in this invention. More information about this device may be obtained by consulting a copending application entitled Semiconductor Switching Devices Ser. No. 508,717 filed Nov. 19, 1965 by Beaudouin and Schroen and assigned to the assignee of this invention now abandoned. Also see U.S. Pat. Nos. 3,204,160; 3,292,057; and 3,302,076.

Briefly, FIG. 2 shows a PNPN diode having a layer 60 of insulating material and a layer 61 of metal-oxide-silicon (MOS deposited over the PNPN diode). The electrodes 62, 63 are the conventional diode electrodes which are used for firing and carrying current through the PNPN diode. The electrode 64 is attached to the MOS layer 61. If a potential is applied over electrode 64 to the MOS layer, the charge carriers are driven some distance into the semiconductor material—as shown by the dotted lines 65, 66. If the potential is removed from the electrode 64 and the MOS layer 61, the charge carriers spread out to occupy the entire semiconductor material. This way the effective area of the junction may be changed to vary the firing characteristics of the PNPN diode. The potential on electrode 64 may, thus, be used for controlling the potential applied to the MOS layer 61, the distribution of the charge carriers in the semiconductor material, and the firing characteristics. Otherwise the PNPN diode behave as all PNPN diodes behave.

Figure 3:
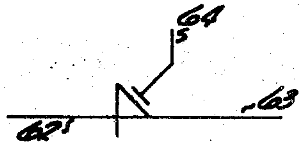
FIG. 3 shows the symbol of an MOS–PNPN diode.

The symbol for an MOS–PNPN diode is shown in FIG. 3. It includes the number "4" with the apex of the number pointing in the direction of conventional positive to negative current flow. Thus, as shown in FIG. 3, current flows from electrode 62 to electrode 63—elections flow from 63 to 62—when the diode is turned on. The electrode 64 is shown by the symbol of FIG. 3, as being connected to an MOS layer which is parallel to the sloping line on the apex of the 4.

The characteristics of the cross-point are:

1. When it is "off," it has a high impedance to give good isolation between the electrodes 62, 63.
2. When "on," it has a low impedance and linear transmission characteristics over the useful range (e.g. the voice frequency range when the network is used in a telephone system).
3. It has a switching condition latching effect controlled by current through the device.
4. The cross-point is self-extinguishing when it is not included in a completed path.
5. The cross-point may be switched "on" when either a high or a low voltage is applied across it depending upon the wave form of the marking voltage used to switch on the cross-point.

6. The cross-point has a "memory effect" by means of which it may be either enabled to or inhibited from normal firing, depending upon whether it has access to a busy or an idle path.

A person designing a system using the invention will look for all of these characteristics when selecting a cross-point. The parameters of any one characteristic depend upon the needs of the system being designed and on the other characteristics which are present in the cross-point. For example, some breath of the high-low switching range may be traded for a greater "memory effect" (or vice versa) in some application Likewise, the parameters of any of the characteristics may be selected relative to the parameters of other characteristic and the needs of any particular circuit design. This is important because it loosens the cross-point tolerance requirements and reduces the network costs. The MOS control layer further loosens tolerances since the potentials applied to it may improve the enabling or inhibiting characteristics.

The diodes are connected across an array of horizontal and vertical busses arranged in a switching matrix. After a diode fires, the potential on the horizontal bus appears as a busy potential on the vertical bus. This vertical bus potential reverse biases all diodes connected to the vertical bus except for the fired diode, and prevents another parallel connected diode from firing.

Figure 4:
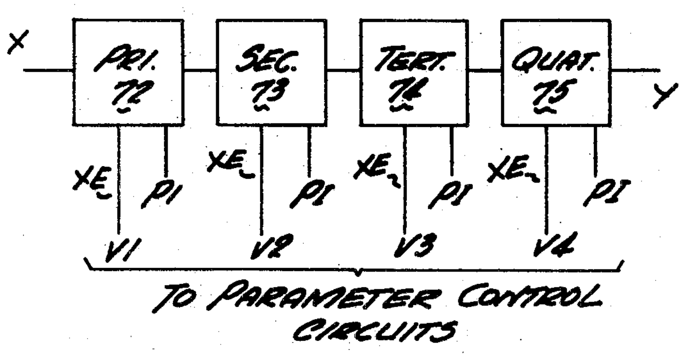
FIG. 4 is a block diagram of an exemplary switching network.
Figures 5, 6, 7:
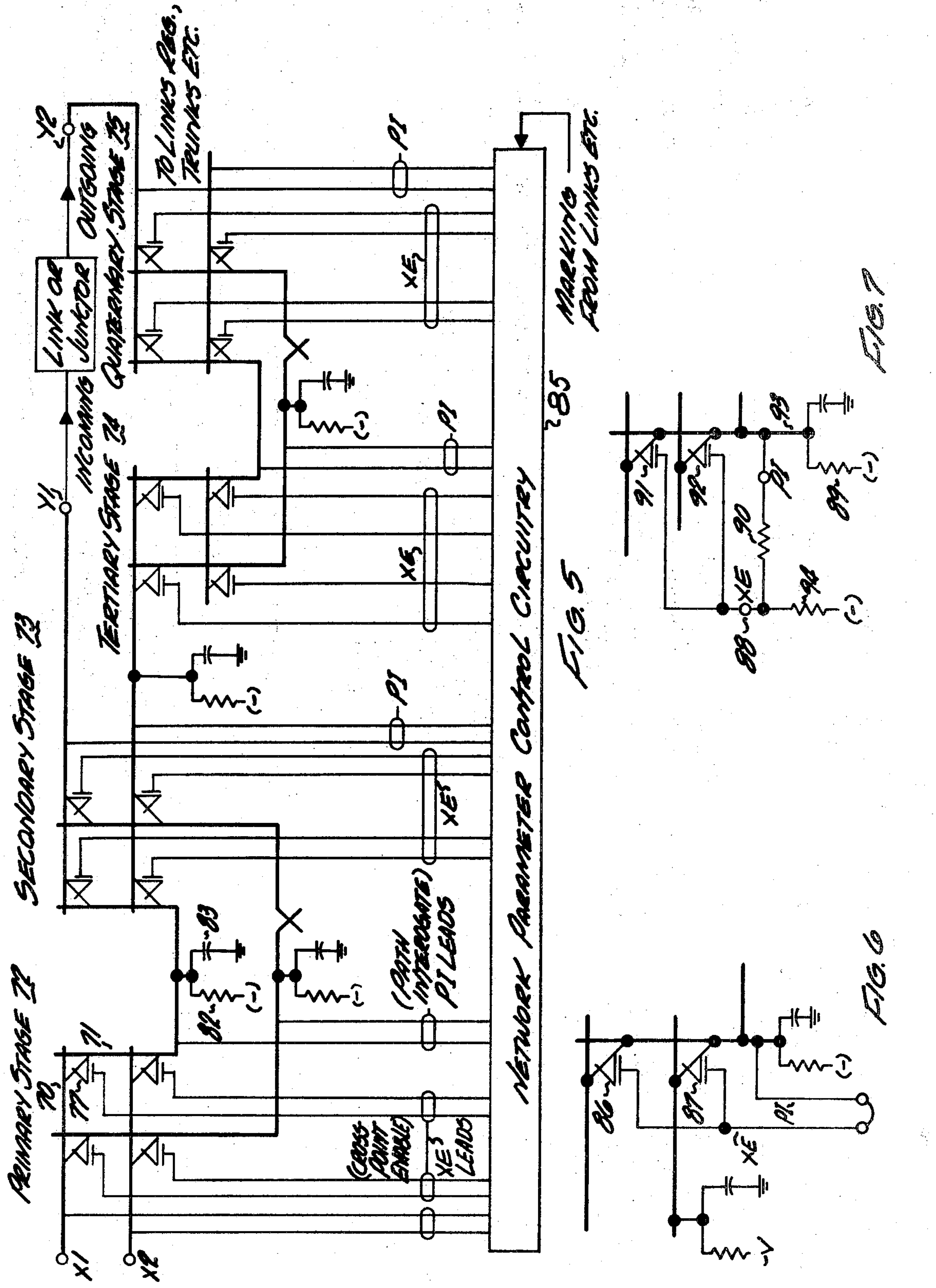
FIG. 5 is a schematic circuit diagram showing an electron network and its attached control equipment.
FIG. 6 is a schematic circuit diagram of a part of a network including a vertical and two horizontals, using an inhibit technique for vertical allotment.
FIG. 7 is a schematic circuit diagram of a part of a network including a vertical and two horizontals, using an enable technique for vertical allotment.

A plurality of cascaded matrices 72, 73, 74, 75, FIGS. 4, 5 are arranged to provide a multistage switching network including primary, secondary, tertiary and quaternary stage matrices.

In construction, each matrix (FIG. 5) has vertical and horizontal multiples including busses such as 70, 71, for example, which are arranged to provide a plurality of intersecting cross-points. At each cross-point, there is a MOS–PNPN semiconductor cross-point switch having the desired characteristics. This cross-point switch fires or breaks down when a potential difference of sufficient magnitude is applied across the horizontal and vertical busses associated therewith.

In operation, conventional current controlled, self-seeking networks operate responsive to end-markings, applied at either end of the path (e.g. X1, Y1, X2, Y2). When a call is placed, horizontal multiple 70, associated with a calling line, is marked with a potential which is of sufficient magnitude to break down or fire at least one connected diodes, such as 77, if the vertical multiple 71 associated therewith is then idle, (i.e. marked by a potential applied via resistance 82). When a diode fires the resistance across the corresponding cross-points virtually disappears, and a potential from the marking source is passed on to the associated vertical multiple and thence to the connected horizontal multiples in the next switching stage.

Means are provided for controlling the firing of diodes as the marking signal is randomly passed, stage by stage, through the cascaded matrices. This means is provided by the resistor-capacitor network (such as 82, 83) coupled to each vertical bus. This capacitor performs four primary functions. First, it speeds the rise of the potential on the vertical bus to fire the diodes in matrices other than the primary matrix, at a rate-sensitive voltage. Second, it causes all fired cross-points to extinguish themselves if a path is not completed before the capacitor is almost fully charged. Third, it slows the return of an idle potential to the vertical bus to prevent the diodes from firing on the rate effect at that time. Fourth, the capacitors supply power for firing the diode in the next succeeding stage and store power over a period of time.

In greater detail, it should be apparent from the foregoing, that a marking potential is passed, stage by stage, through each of the cascaded matrices. As a diode fires in each stage, the voltage shoots up on the vertical bus because the diode fires into the vertical bus capacitance, such as 83. This means that the diodes in other than the primary matrix will fire at the low voltage because they fire on the rate effect. Since they are firing at the lower voltage, the various voltage drops are such that the current through the primary matrix diodes does not fall below the holding point. Any diodes which fire, but are part of a path which does not reach a terminating point, hold "on" only while the associated vertical bus capacitor (such as 83) charges. As soon as the capacitor is sufficiently charged, the diode starves for want of current and switches "off." In resume, the foregoing has briefly described an exemplary self-seeking current-controlled network. More information may be had by consulting U.S. Pat. No. 3,204,044 and others.

A plurality of self-seeking connections are extended through the matrices in a random manner. These connections are extended in search of a multiple which is selectively marked (as a Y1). During this search virtually all idle paths are explored. Because the cross-points are switched "on" and "off" in a random manner, current flows through the first path which is completed from the marked horizontal to the marked vertical and holds the diodes in that path in an "on" condition. After a diode fires and its associated capacitor charges, that diode must turn "off" unless it is part of the completed path.

For any of many reasons, it may be desirable to guide the switch paths in some degree while maintaining a randomness of path selection. For example, some paths may be dead end with respect to a desired set of end points. Sometimes it may be desirable to setup preference patterns which prefer one type of path as a first option and another type of path as a second option—but only if the first option is not available. Sometimes, the network might be used in conjunction with a computer type of data processor which has its own special routing requirements. Other reasons for making a preference selection will readily occur to those who are skilled in the art.

There are many means for and methods of guiding switch paths, here generically represented by the block 85. For example, those skilled in the art know about certain forms of network parameter control circuits, as for example, guidewire networks and replica networks with or without interrogation leads, wherein paths find their own way and then apply control potentials over enable busses in order to operate cross-points. As shown in FIG. 5, the leads or data busses from the guidewire or replica networks 85 may be extended to the individual cross-points and there connected to the MOS layers of the MOS–PNPN diodes. This way, the potentials applied to such layers enable the firing of some diodes while inhibiting the firing of other diodes. Thus, the resulting effect is to guide the switch paths—to a degree—according to decisions which may be made by the equipment in the network parameter control circuit 85.

For a further control, each succeeding stage may include MOS–PNPN diodes having different firing voltage characteristics. The exact nature or these diode characteristics depends, at least to a degree, upon the parameters of the circuit needs. Thus, the network designer may elect to use one kind of a diode where a higher potential characteristic enables a diode to be fired at a higher potential. Or the election may be to use a diode of a kind where a higher potential drives the diode deeper into a condition of inhibition wherein it becomes much more difficult to fire the diodes.

The nature of a network using this added degree of sophistication should be apparent from a further study of FIG. 4. The four stages 72—75 are similar to the four stages of FIG. 5. The voltages $V_1$—$V_4$ are the idle marking potentials applied to the vertical busses via resistors such as the resistor 82 in FIG. 5. If the diodes are of a type wherein the higher potentials cause the diodes to fire at higher potentials, the idle marking bias voltages are $V_1>V_2{}'_3>V_4$. Or conversely, if the higher potentials drive the diodes deeper into a state of inhibition, the bias voltages are $V_1<V_2{}'_3<V_4$. In any event, the point is that the end-marking voltage applied at the point X must cause the diodes in the primary matrix 72 to break down and apply the firing voltages to the diodes in the secondary matrix 73. The difference in potential between the voltages used to fire the diode, in matrix 72 and matrix 73 must be adequate to draw current, at a holding level, through the fired diode in the primary matrix. The converse is also true for the controlled inhibit-type of diode. The primary matrix diode is inhibited from firing except at a potential which is sufficiently high to overcome the inhibition on the diodes in the next cascaded stage and still leave a potential difference across the fired primary stage diode which is adequate to maintain the flow of holding current through it. The blocks 72—75 are also shown as having a cross-point enable conductors XE and path interrogater conductors PI extending thereto. These conductors also shown in FIG. 5 which may be selectively energized in order to enable or inhibit the cross-points, as may be required.

As pointed out above, the prior art already discloses a number of ways of making a path selection, such as through a use of guidewires, computer, data processors, self-seeking searches, and the like. The remaining FIGS. 6—9 disclose ways of implementing an integration of the subject matrix into a complete system using any one of these various control techniques.

For a system using enabled diodes to make a self-seeking search, the vertical (or horizontal) bias is applied as disclosed in FIG. 6. The MOS–PNPN devices (such as 86) which are used here have a characteristic such that they fire under a zero volt bias, and they are prevented from firing by an application of a positive bias to the MOS layer. The path is originally selected in a completely self-seeking manner as disclosed in U.S. Pat. No. 3,324,248 and patents cited therein. In the idle state, the vertical bias on conductor PI is essentially zero with respect to the vertical potential and the voltage fed back over the XE conductor plays no part in the matrix operation. After the path is selected, a positive bias appears on the busy vertical and is fed back, via the XE conductor, to the MOS layer of all diodes connected to that conductor. This MOS layer bias drives the charge carriers into the semiconductor material of the PNPN diode and gives them a much higher firing potential. If, therefore, the diode 86 has fired, and it is in a turned on state, the diode 87 is inhibited, and it cannot be turned on by any firing potentials normally appearing in the matrix.

The converse situation is also true. When the diodes are inhibited, a positive potential is applied to the MOS layer. More particularly, the diodes of FIG. 7 are enabled when a negative potential is applied to the XE terminal 88. Hence, in FIG. 7 a relatively high negative potential is applied through the resistors 89 and 90 to the XE bias point 88 and on to the gate electrode of each of the MOS–PNPN diodes 91, 92. Each diode in the marked vertical is thus enabled. During the self seeking search, diode 91 may fire, for example. The positive potential from the end-marking source then reached the vertical bus 93, parameter interrogate point PI and the voltage enable Point XE. The voltage divisions across the resistors 90, 94 are such that the point 88 moves positive to inhibit the diode 92 and keep it from firing.

The embodiments of FIGS. 6, 7 show the manner in which a self-seeking network may be self-controlled by markings fed back from busy or idle verticals to enable or inhibit various diodes connected thereto in order to facilitate searching. The gates of FIGS. 8 and 9 show means by which peripheral equipment may add a further control gating according to pulses which are generated during a route search.

Figure 8:
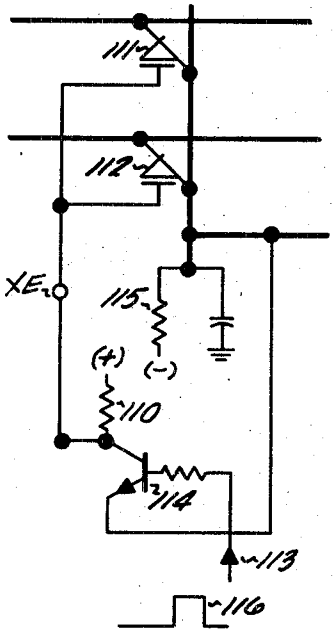
FIGS. 8 and 9 are comparable to FIGS. 6 and 7, respectively, but with electronic switches for enabling a control over the network from peripheral equipment.

In the embodiment of FIG. 8, the diodes are essentially the same as those shown in FIG. 6. Normally, a relatively high positive potential is applied through a resistor 110 to inhibit the MOS–PNPN diodes 111, 112. Therefore, if a route search is being conducted and if the diodes 111, 112 cannot be used to complete the pertinent path, they are inhibited. On the other hand, if the diodes can be used, associated equipment (not shown) applies an enable pulse 116 to the conductor 113, as disclosed in U.S. Pat. No. 3,221,104, for example. This pulse 116 makes the base of an NPN transistor 114, (used as a DC switching device) more positive than the emitter, and the transistor turns on. The two resistors 115, 110 are connected in series between sources of negative and positive voltage, the voltage divisions being such that the diodes 111, 112 are enabled. Therefore, during the next search, one of these diodes is turned on. After the route search is completed, the enabling pulse disappears, the transistor 114 turns off, and the positive potential applied through the resistor 110 returns to inhibit the diodes 111, 112.

Figure 9:
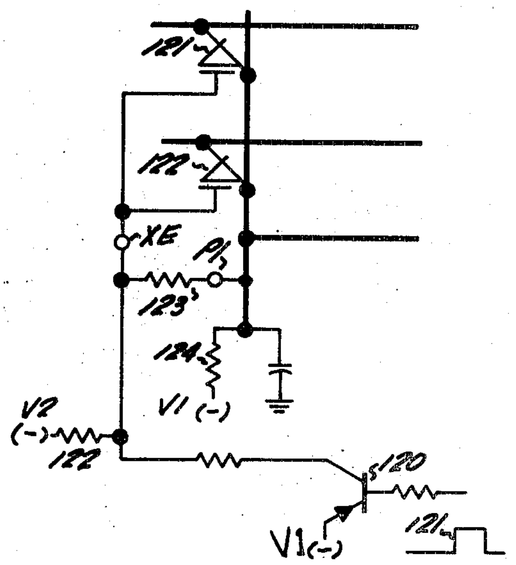

The embodiment of FIG. 9 shows the situation wherein the gating pulses are applied to a circuit of the type shown in FIG. 7. Under normal, steady state conditions, the transistor 120 is turned on and a negative voltage $V_{1(-)}$ is applied to the point XE. Since the same voltage $V_{1(-)}$ is applied to both the anode and the MOS layer of the diodes 121, 122, the potential difference between points PI and XE is zero. Thus, the diodes are initially biased to have a given firing potential. Thereafter the transistor base is biased with a pulse 121 which turns off the transistor, and thereby removes the negative voltage $V_{1(-)}$. When the voltage $V_{1(-)}$ disappears, the point XE reaches a potential established by a voltage division across the series of resistors 122, 123, 124. The voltage $V_{2(-)}$ applied through resistor 122 is much more negative than the voltage $V_{1(-)}$. Therefore, the diodes 121, 122 are enabled, and the route search may proceed in the usual manner. After the path is completed, a positive potential is fed back from the busy vertical via the resistor 123 to inhibit all unfired diodes coupled to that busy vertical. When the enable pulse 121 disappears, the transistor 120 turns on again to effectively remove the enabling potential $V_{2(-)}$ by reapplying the voltage $V_{1(-)}$ or the busy potential to the junction between the resistors 122, 123.

Figure 11:
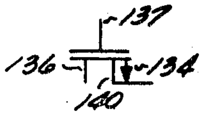
FIG. 11 is the symbol for an MOS–FET.
Figure 10:
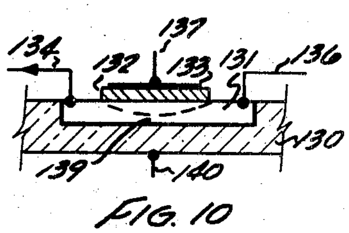
FIG. 10 is a cross-sectional view of an MOS field effect transistor switch (MOS–FET)
Figure 12:
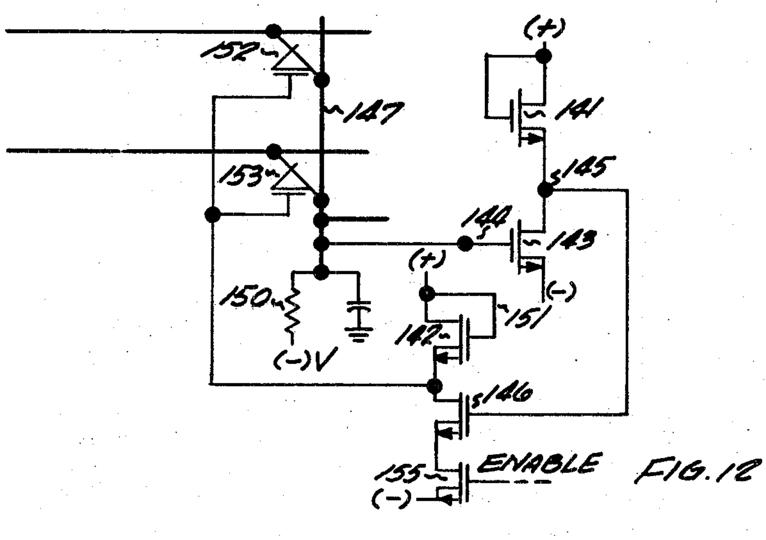
FIG. 12 is a circuit, similar to the circuits of FIGS. 8 and 9, using all MOS devices so that they can be made on a single chip of semiconductor material.

The foregoing explains the gating and matrix control functions of a switching system using MOS–PNPN diodes. In general, this explanation has proceeded as if all components were discrete elements. However, such use of discrete elements tends to overlook one of the more attractive features of the MOS–PNPN diodes since they offer a device which is well suited for construction in a monolithic unit. Thus, if a single semiconductor chip is prepared containing the PNPN diodes, it is convenient also to build into the same chip all of the other components which may be required to complete the matrix plus the gate controls. FIGS. 10—12 show how these MOS–PNPN diodes and associated gating devices, may be combined into a single chip. For this, we use MOS–FET devices in place of conventional transistors since all of the MOS devices are compatible devices.

The MOS–FET device is, of course, well known. However, so that the symbology, as used herein, may be definite and certain, reference may be made to FIG. 10 which shows a semiconductor substrait 130 (called the "body") having a diffused layer 131 (called a "channel") deposited therein. A layer of insulating material 132 is laid down over the channel 131, and an electrode 133 is attached thereto. A first electrode 134 (called a "source") is attached to one end of the channel, and another electrode 136 (called a "drain") is attached to the other end. A third electrode 137 (called a "-gate") is attached to the layer 133. The device operates as a vacuum tube operates. Electrons enter the channel 131 at 134, flow through the channel and exit at 136; this is comparable to a release of electrons at a hot cathode and a collection of the electrons at the plate of the tube. A potential on the gate electrode drives the charge carriers out of a depletion zone and into a restricted zone 139 through which the charge carriers must flow. As the potential on the electrode 137 increases or decreases, the boundary of depletion zone 139 expands or contracts to enlarge or reduce the channel through which the electrons may flow. This is essentially the same function that is produced by the grid of a vacuum tube.

The substrait 130 is biased via an electrode 140 to produce an isolating back bias voltage with respect to the bias voltage on the channel material 131. This way, a number of channels may be diffused into the same substrait without allowing charge carriers to flow between them.

The symbol for an MOS–FET device is shown in FIG. 11. The relationship between the symbol leads and the actual electrodes should be apparent from a comparison of reference numerals Usually, the source 134 and substrait 140 are both connected to ground, and a source of relatively high potential connected to the drain 136 sets the potential in the channel. This combination establishes a back biased isolating diode around the periphery of the channel.

FIG. 12 shows how the embodiment of FIG. 8 may be made entirely from MOS devices which may be incorporated into the same substrait. Preferably, an entire vertical (cross-points and gates) may be designed into a single chip. Or, the design could be changed to include an entire horizontal of a matrix.

The two MOS–FET devices 141, 142 are clamping circuits which provide a known voltage drop with a suitable temperature stabilization. The MOS–FET device 143 provides a polarity inversion so that opposite polarities appear at the two points 144, 145, to enable the device 146 to receive the proper bias potentials.

Normally, the vertical bus 147 stands at a potential provided by −V volts applied through the resistor 150. The MOS layer of each diode is biased to a positive potential established by the MOS–FET device 142 which is turned on responsive to the permanent bias provided by the connection 151. This causes a positive bias which is an inhibit upon the diodes 152, 153.

During a quiescent condition, the positive voltage applied to the gate of MOS–FET device 141 causes a positive voltage to appear at the point 145 and at the gate of the MOS–FET device 146, but it does not turn on since the source is open circuited because device 155 is turned off. The positive voltage on the source of MOS–FET device 142 causes a positive voltage to appear on the gate or MOS layers of the PNPN diodes 152, 153 and they are inhibited.

When it is desirable to conduct a route search through the matrix, an enable pulse is applied to the gate of the MOS–FET device 155 which turns on. Since the MOS–FET device 141 is applying a positive voltage to the gate of the MOS–FET device 146, it also comes on when its source is energized by the turning on of the device 155. A negative voltage is now applied from the source of device 155 through its drain, to the source and drain of the device 146 and on to the gates of the diodes 152, 153.

The diodes 152 and 153 are enabled so that either may select itself during a random search through the matrix. When the appropriate diode is so selected and turned on, the vertical bus 147 goes positive, as does the point 144. The gate of the MOS–FET device 143 is made positive, and it turns on so that negative source voltage appears at the point 145. The source electrode of the MOS device 141 is back biased and it turns off. The gate electrode of the MOS device 146 is made negative, and it cannot turn on. Later, during any subsequent route search, an enable pulse may again appear at the gate electrode of the MOS–FET device 155, but it cannot have any effect because the device 146 is positively inhibited by the negative potential at point 145 and on its gate electrode. When the path is released, the diode 152 or 153 turns off. The vertical bus potential goes negative, and the gate returns to its quiescent condition.

The circuit of FIG. 12 is an exemplary disclosure of how a matrix may be designed using nothing but compatible MOS devices so that all components may be mounted on a single chip of semiconductor material. Those who are skilled in the art will readily perceive how to modify the other circuits in a similar manner. Therefore, the appended claims are to be construed broadly enough to cover all equivalents falling within the true scope and spirit of the invention.

The foregoing specification and attached claims refer to MOS devices. This term is to be construed broadly enough to cover all reasonable equivalents. More particularly, metal oxide silicon (MOS) technology incorporates field effect technology. Therefore, as used herein, the term MOS is intended to cover any suitable type of devices controlled by an electric field acting upon the charge carriers in a semiconductor material.

While the principles of the invention have been described above in connection with specific apparatus and applications, it is to be understood that this description is made only by way of example and not as a limitation of the scope of the invention.

We claim:

1. An electronic switching means comprising at least one matrix having intersecting vertical and horizontal multiples with cross-point switch means connected across each intersection, each of said switch means comprising at least one electrode for controlling the switching characteristics of said cross-point, means for conducting a self-seeking route search through randomly selected ones of said cross-point, and means responsive to prevailing busy and idle conditions for selectively applying control potentials to said one electrode for changing the characteristics of said cross-points as a function of their availability.

2. The switching means of claim 1 wherein said cross-point switches are metal-oxide-silicon PNPN diodes, said one electrode being connected to the metal-oxide-silicon layer of said diodes.

3. The switching means of claim 1 wherein a potential on said multiples changes as a function of the availability of said multiple, and means for coupling said one electrode to said multiple thereby feeding back a control potential to enable or inhibit said cross-point switches.

4. The switching means of claim 3 wherein said coupling means between said one electrode and said multiple includes an enable gate, and means responsive to the conductive state of said enable gates for enabling the cross-point switches connected to any idle vertical multiple during intervals while selected route searches are in progress.

5. The switching means of claim 4 wherein said cross-point switch and said enable gates are metal-oxide-silicon devices.

6. The switching means of claim 3 wherein said coupling means between said one electrode and said multiple includes an inhibit gate, and means responsive to the conductive state of said inhibit gates for inhibiting the cross-point switches connected to any idle verticles except while selected route searches are in progress.

7. The switching means of claim 1 wherein said network comprises a plurality of cascaded stages, and means for biasing each succeeding stage in said cascade to a potential which is incrementally different from the biasing potential of adjacent stages in said cascade.